(12) United States Patent
Berard

(10) Patent No.: US 8,027,757 B2
(45) Date of Patent: Sep. 27, 2011

(54) METHOD AND DEVICE FOR AIDING THE MANAGEMENT OF SUCCESSIVE FLIGHTS OF AN AIRCRAFT

(75) Inventor: Jeremy Berard, Fenouillet (FR)

(73) Assignee: Airbus Operation SAS, Toulouse (FR)

( * ) Notice: Subject to any disclaimer, the term of this patent is extended or adjusted under 35 U.S.C. 154(b) by 710 days.

(21) Appl. No.: 11/828,909

(22) Filed: Jul. 26, 2007

(65) Prior Publication Data

US 2010/0030404 A1 Feb. 4, 2010

(30) Foreign Application Priority Data

Jul. 31, 2006 (FR) ...................................... 06 06992

(51) Int. Cl.
G06F 7/70 (2006.01)
(52) U.S. Cl. ........................................... 701/14; 701/35
(58) Field of Classification Search ..................... 701/14, 701/3, 35
See application file for complete search history.

(56) References Cited

U.S. PATENT DOCUMENTS

| 6,181,987 | B1 | 1/2001 | Deker et al. | |
| 6,456,911 | B1* | 9/2002 | Muramatsu | 701/25 |
| 7,577,501 | B2* | 8/2009 | Tafs et al. | 701/14 |
| 2005/0197748 | A1* | 9/2005 | Holst et al. | 701/3 |
| 2005/0217367 | A1* | 10/2005 | Atkinson | 73/290 V |
| 2005/0283281 | A1 | 12/2005 | Hartmann et al. | |
| 2007/0164877 | A1* | 7/2007 | Mumaw et al. | 340/973 |
| 2008/0312777 | A1* | 12/2008 | Dey et al. | 701/3 |

FOREIGN PATENT DOCUMENTS

| EP | 1 496 461 | 1/2005 |
| FR | 2 752 934 | 3/1998 |
| GB | 2 176 035 | 12/1986 |

OTHER PUBLICATIONS

Preliminary Search Report dated Jun. 19, 2007.

\* cited by examiner

*Primary Examiner* — Mark Hellner
(74) *Attorney, Agent, or Firm* — Dickinson Wright PLLC

(57) ABSTRACT

The invention relates to a method and device for aiding the management of successive flights of an aircraft. The device includes a determination unit which uses values recorded automatically for a flight, to automatically determine the values of characteristic parameters for waypoints of a next flight.

8 Claims, 2 Drawing Sheets

METHOD AND DEVICE FOR AIDING THE MANAGEMENT OF SUCCESSIVE FLIGHTS OF AN AIRCRAFT

TECHNICAL FIELD OF THE INVENTION

The present invention relates to a method and a device for aiding the management of successive flights of an aircraft, in particular of a transport plane.

The present invention applies, more particularly, to successive flights (V0, V1, ... Vn, ... ) which are such that the destination of any flight Vn corresponds to the origin of the next flight Vn+1, n being an integer greater than or equal to 1.

Within the framework of the present invention, it is considered that each flight is carried out according to a particular flight plan which comprises a plurality of waypoints. Moreover, for each flight, the values of a plurality of characteristic parameters, including at least some of the following characteristic parameters: the transit time, the speed, the altitude and the mass of fuel on board, are determined automatically (with the aid of initial data, of the corresponding flight plan and of characteristics related to the aircraft), for each waypoint of said flight plan.

BACKGROUND OF THE INVENTION

It is known that, in a standard flight management system, in particular of the FMS ("Flight Management System") type, each flight plan is initialized independently. The predictions which are therefore carried out on a subsequent flight plan do not depend on the state of the flight which precedes it. Thus, for two (or more) successive flights, with no refueling between the flights, there is an uncertainty regarding the second flight. Specifically, the conditions encountered during the first flight (wind, unscheduled change of route, etc) may strongly influence the consumption of fuel on completion of this first flight, and hence the fuel available for the next flight. Likewise, the flight time for the first flight may be influenced by various events, and this may possibly modify the departure time of the next flight.

Such effects are significant especially in the case of military aircraft which perform a series of successive flights without refueling during the various stops (for example connecting flights between airbases).

Consequently, with a standard flight management system such as this, the pilot of the aircraft must carry the predictions relating to the first flight over to the initial conditions of the next flight, and must do so very regularly so as to take account of alterations in the conditions encountered during this first flight. This mode of operation therefore makes it necessary to carry out in-flight manipulations on the next flight, thereby increasing in particular the workload of the pilot or of the crew of the aircraft.

SUMMARY OF THE INVENTION

The present invention relates to a method of aiding the management of flights for successive flights, which makes it possible to remedy the aforesaid drawbacks.

For this purpose, according to the invention, said method of aiding the management of flights, for successive flights of an aircraft, which are such that the destination of any flight Vn corresponds to the origin of the next flight Vn+1, n being an integer greater than or equal to 1, each flight being carried out according to a particular flight plan comprising a plurality of waypoints, according to which method the values of a plurality of characteristic parameters, including at least some of the following characteristic parameters: the time of transit, the speed, the altitude and the mass of fuel on board, are determined automatically, for each flight, with the aid of initial data, of the corresponding flight plan and of characteristics related to the aircraft, for each waypoint of said flight plan, is noteworthy in that:

for each flight Vn, the values existing at the last waypoint which corresponds to the destination of this flight Vn are recorded automatically, doing so for at least some of said characteristic parameters; and for a next flight Vn+1, at least some of the values recorded for the flight Vn are used automatically as initial data, to determine the values of the various characteristic parameters relating to said flight Vn+1 (doing so right from the first waypoint or origin thereof).

Thus, by virtue of the invention, an automatic procedure (recording, transmission, and use of values of characteristic parameters) is obtained which makes it possible to take automatic account of at least some of the characteristic parameters (such as the transit time or the mass of fuel on board) which exist at the end of any flight Vn, so as to determine the values of the various characteristic parameters relating to the next flight Vn+1. Consequently, the present invention makes it possible to take account, in an automatic and regular manner, of the vagaries encountered during a flight so as to predict the next flight.

Of course, for the first flight V1 (n=1) of a plurality of successive flights Vn, only the data which have been input by an operator, in particular a crew member of the aircraft, are used as initial data. It is possible for the values recorded to be taken into account only onward of the second flight V2 (n=2) and for all the following flights (V3, V4, ... ) of this series of successive flights.

Advantageously, the values of the characteristic parameters are determined with the aid of at least one standard prediction function.

Furthermore, if an operator, in particular the pilot of the aircraft, provides time information corresponding to the time spent on the ground by the aircraft between a flight Vn and the next flight Vn+1, then the sum of the value of the time of arrival of the flight Vn, which was recorded automatically at the end of said flight Vn, and of the time information provided by the operator is advantageously used as value of the departure time of said flight Vn+1.

Moreover, if an operator, in particular the pilot of the aircraft, provides mass information corresponding to a variation in fuel-less mass achieved on the ground between a flight Vn and the next flight Vn+1, then the sum of the value of the mass of fuel on board, which was recorded at the end of the flight Vn, of the unladen mass of the aircraft, and of the mass information provided by the operator is advantageously used as value of total mass of the aircraft at the departure of said flight Vn+1.

Additionally, in a preferred embodiment, if an operator provides the values of initial data for a flight Vn+1, then said values provided by the operator are used by priority with respect to the values recorded for the previous flight Vn, for the same data.

The present invention also relates to a device for aiding the management of flights for successive flights of an aircraft, in particular of a military or civil transport plane.

According to the invention, said device for aiding the management of flights, for successive flights of an aircraft, which are such that the destination of a flight Vn corresponds to the origin of the next flight Vn+1, n being an integer greater than or equal to 1, each flight being carried out according to a particular flight plan comprising a plurality of waypoints, this device comprising:

first means for inputting data; and second means for automatically determining for each flight, with the aid of initial data, of the corresponding flight plan and of characteristics relating to the aircraft, for each waypoint of said flight plan, the values of a plurality of characteristic parameters, including at least some of the following characteristic parameters: the transit time, the speed, the altitude and the mass of fuel on board, is noteworthy in that:

said device moreover comprises:

third means for automatically recording, on at least one recording medium, for each flight Vn, the values existing at the last waypoint which corresponds to the destination of this flight Vn, doing so for at least some of said characteristic parameters; and fourth means for automatically transmitting said values recorded on said recording medium to said second means; and said second means are formed so as to automatically use, for a next flight Vn+1, at least some of the values recorded for a flight Vn, as initial data, so as to determine the values of the various characteristic parameters relating to said flight Vn+1.

Furthermore, in a particular embodiment, said device comprises, moreover, automatic selection means which select (automatically) by priority values input (by an operator) with the aid of said first means with respect to values relating to the same data which were recorded by said third means, so that they are transmitted to said second means and used by the latter.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
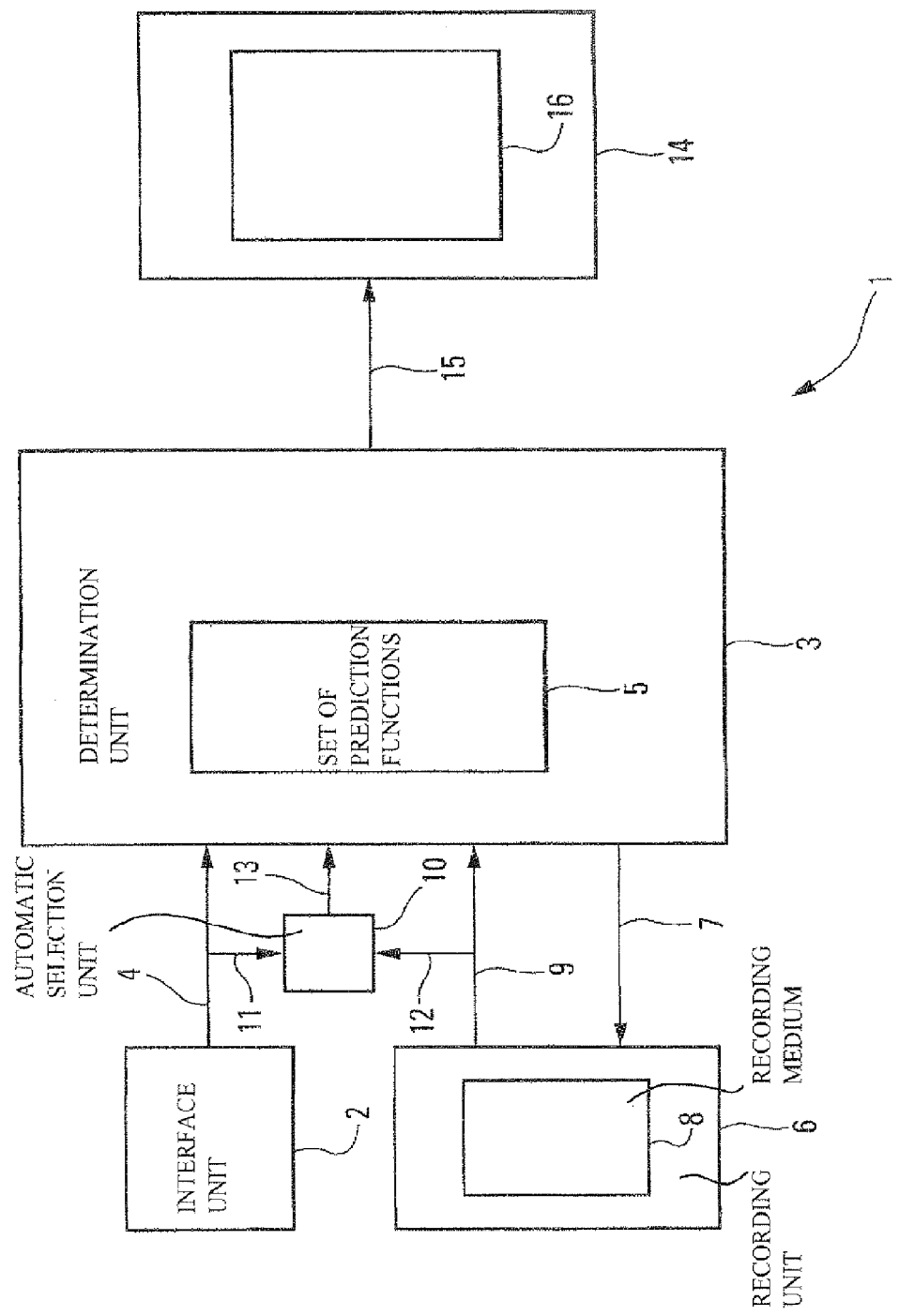
FIG. 1 is the schematic diagram of a device in accordance with the invention.

The device 1 in accordance with the invention and represented diagrammatically in FIG. 1 is intended to aid the crew of an aircraft A for the purpose of managing flights during successive flights of said aircraft A. These successive flights are such that the destination of any flight Vn corresponds to the origin of the next flight Vn+1, n being an integer greater than or equal to 1. Consequently, within the framework of the present invention, a series of successive flights V1, V2, V3, . . . is taken into account.

Figure 2:
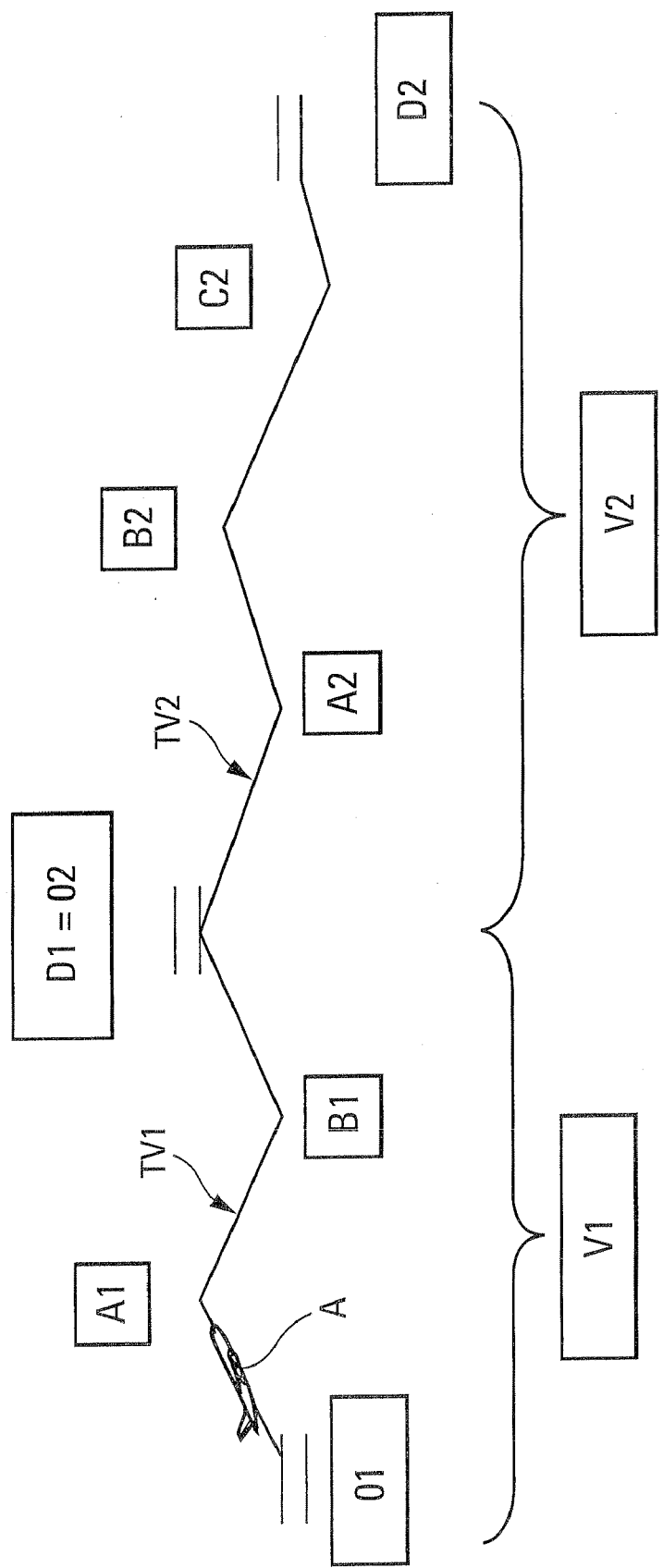
FIG. 2 is a graph illustrating a series of successive flights, such as are considered in the present invention.

In the example of FIG. 2, only two successive flights V1 and V2 have been represented. Each flight V1, V2 is carried out, in standard fashion, according to a particular flight plan PV1, PV2 comprising a plurality of waypoints which are defined along a corresponding flight trajectory TV1, TV2. In the example of FIG. 2:

the flight V1 comprises the waypoints O1, A1, B1 and D1, O1 being the origin of said flight V1 and D2 being the destination of this flight V1; and the flight V2 comprises the following waypoints: O2, A2, B2, C2, D2. O2 is the origin of this second flight V2 and therefore corresponds to the destination D1 of the previous flight V1, and D2 is the destination of this second flight V2.

Said device 1 is of the type comprising:

means 2 which correspond to an interface means, comprising for example a keyboard and/or a computer mouse, and which allow an operator, in particular the pilot of the aircraft A, to input data (specified hereinbelow) into said device 1; and means 3 which are connected by way of a link 4 to said means 2 and which are formed so as to automatically determine for each flight V1, V2, with the aid of initial data, of the corresponding flight plan TV1, TV2 and of models which take account of the characteristics of the aircraft A (engines, aerodynamics, performance, etc), the values of characteristic parameters.

To do this, said means 3 comprise a set 5 of standard prediction functions. More precisely, said means 3, in particular a flight management system of FMS type determine the values of characteristic parameters for each flight, for example for the flight V1. More precisely, said means 3 determine, for each waypoint O1, A1, B1, D1 of a flight plan PV1, the values of a plurality of characteristic parameters, including at least some of the following characteristic parameters:

the transit time predicted at said waypoint;

the speed of the aircraft A predicted at said waypoint;

the altitude of the aircraft A predicted at said waypoint; and the mass of fuel on board predicted at said waypoint.

Moreover, by adding the unladen mass of the aircraft ZWF ("Zero Fuel Weight") which is constant during a flight, to the mass of fuel on board FOB ("Fuel On Board") which is variable during the flight and which is therefore different at each waypoint, the total mass GW is obtained, which is such that:

$$GW=ZFW+FOB$$

As indicated previously, said means 3 use in particular the values of initial conditions input by an operator (in particular the pilot of the aircraft) with the aid of said means 2, to calculate the predictions along a flight plan PV1, PV2. Generally, the pilot inputs, with the aid of said means 2, the following initial conditions:

the flight plan PV and its parameters;

the meteorological data known on departure of the aircraft A;

mass and center of gravity information known on departure of the aircraft A; and a strategic criterion for optimization, which specifies the desired relationship between the fuel consumption and the flight time and which is used by prediction functions, which are integrated into the set 5 of said means 3.

The previous data are thereafter modifiable in flight, in particular so as to initiate a new calculation of predictions if the parameters have varied during the flight.

According to the invention, to aid the management of successive flights (as mentioned above) of an aircraft A;

the device 1 moreover comprises:

means 6 which are connected by way of a link 7 to said means 3 and which are formed in such a way as to automatically record, on at least one standard recording medium 8, for example a diskette or an integrated memory, for each flight Vn, for example for the flight V1, the values of at least some of the aforesaid characteristic parameters, and in particular the amount of fuel on board and the transit time, which exist at the destination of this flight. For the flight V1, said means 6 therefore record the values of said characteristic parameter or parameters, which exist at the last waypoint D1 of said flight V1, that is to say at its destination; and standard linking means 9, which make it possible to automatically transmit the values thus recorded on said recording medium 8 to said means 3 for the purpose of their use; and said means 3 are formed so as to automatically use, for a next flight Vn+1, for example for the flight V2, at least some of the values recorded for the flight Vn, for example for the flight V1. These recorded values are used automatically as initial data, by the prediction functions integrated into the set 5, to determine the values of the various characteristic parameters relating to said next flight Vn+1, for example the flight V2.

More precisely, in the example of FIG. 2, the values relating to the destination D1 of the flight V1 are used to determine the values of characteristic parameters (transit time and mass of fuel on board for example) at the various waypoints O2, A2, B2, C2, D2 of the flight plan PV2 of said next flight V2.

Consequently, the predictions in respect of the flight V2 are calculated on the basis of initial data which depend on the conduct of the flight V1 and are updated with the predictions of the flight V1. This makes it possible to forecast, before or during the flight V1, the conduct of the flight V2, while automatically taking account of the vagaries of said flight V1.

It will be noted that, even though a recording relates to data predicted for the end (or destination) of any flight Vn, this recording is carried out according to the invention, regularly, before or during this flight Vn.

Additionally, said means 2 are formed in such a way as to allow the crew to specify certain values such as:

the time spent on the ground between two successive flights, for example between the flight V1 and the flight V2; and the forecast variation in the no-fuel mass on the ground between two successive flights, for example between the flights V1 and V2. This variation may be due to a loading or unloading of passengers or freight.

In this case, if an operator (for example a crew member) provides the device 1, with the aid of the means 2, with time information corresponding to the time spent on the ground by the aircraft A between a flight Vn and the next flight Vn+1, the means 3 use, as value of the departure time of said flight Vn+1, the sum:

of the value of the time of arrival of the flight Vn, which was recorded automatically at the end of said flight Vn; and of the time information provided by the operator.

Furthermore, if an operator provides the device 1 with the aid of the means 2 with mass information corresponding to a variation of fuel-less mass achieved on the ground between a flight Vn and the next flight Vn+1, the means 3 use, as value of the total mass of the aircraft A at the departure of said flight Vn+1, the sum:

of the value of the mass of fuel on board, which was recorded at the end of the flight Vn;

of the unladen mass of the aircraft A; and of the mass information provided by the operator.

Additionally, said device 1 furthermore comprises automatic selection means 10 which are connected by way of links 11, 12 and 13 respectively to said means 2, 6 and 3. These automatic selection means 10 select (automatically) by priority the values which are input into the device 1 with the aid of said means 2, with respect to the values relating to the same data which were recorded by said means 6, so that they are transmitted to said means 3 and used by the latter in the prediction calculations. Consequently, if an operator, in particular the pilot of the aircraft A, inputs the value of at least one datum (and in particular the values of the mass of fuel on board the aircraft A, of the total mass of the aircraft A and/or of the departure time of a flight), said means 3 use this value input, and not the value relating to the same datum which was recorded at the end of the previous flight on the recording medium 8. Consequently, the pilot retains command of said device 1 in accordance with the invention.

Of course, the part of the above description which relates to two successive flights V1 and V2 applies, in identical fashion, to each pair of successive flights Vn+Vn+1 of any series of successive flights.

The device 1 in accordance with the invention therefore implements an automatic procedure (recording, transmission, and use of values of characteristic parameters, which makes it possible to take into account, automatically, at least some of the characteristic parameters (such as the transit time or the mass of fuel on board) which exist at the end of any flight Vn, to determine the values of the various characteristic parameters relating to the next flight Vn+1. Consequently, said device 1 makes it possible to take into account, in an automatic and regular manner, the vagaries encountered during a flight to predict the next flight.

Of course, for the first flight V1 (n=1) of a plurality of successive flights Vn, the means 3 use only, as initial data, the data which were input by an operator, in particular a crew member of the aircraft, by way of the means 2, since it has not been possible to record any datum. It is possible for the values recorded (by way of the means 6) to be taken into account only onward of the second flight V2 (n=2) and for all the following flights (V3, V4 etc.) of this series of successive flights.

The invention claimed is:

1. A method of aiding management of flights, for successive flights of an aircraft, which are such that a destination of a flight Vn corresponds to an origin of a next flight Vn+1, n being an integer greater than or equal to 1, each flight Vn and Vn+1 being carried out according to a respective flight plan PVn and PVn+1, each comprising a plurality of waypoints, the method comprising:

automatically determining initial values of a plurality of characteristic parameters, including the following characteristic parameters: time of transit, speed, altitude, and mass of fuel on board, for said flight Vn, with aid of initial data, of the flight plan PVn and of characteristics related to the aircraft, for each waypoint of said flight plan PVn;

automatically determining initial values of said plurality of characteristic parameters for said flight Vn+1 and of characteristics related to the aircraft, for each waypoint of said flight plan PVn+1, with aid of the initial values relating to a destination D1 of said flight plan PVn;

during said flight Vn, replacing, in accordance with actual conditions of said flight Vn, said initial values of at least some of said plurality of characteristic parameters of said flight plan PVn with modified values of said at least some of said plurality of characteristic parameters, for each waypoint of said corresponding flight plan PVn, to obtain an updated set of values of said plurality of characteristic parameters of said flight plan PVn which includes said modified values of said at least some of said plurality of characteristic parameters of said flight plan PVn and said initial values of other characteristic parameters of said plurality of characteristic parameters of said flight plan PVn;

forecasting, during the flight Vn, based on said initial values of said plurality of characteristic parameters for the flight Vn+1 and the updated set of values recorded for the flight Vn, including the value of the mass of fuel on board, the expected conduct of the flight Vn+1 based on forecasted initial values of the plurality of characteristic parameters relating to the flight Vn+1;

automatically recording, for said flight Vn, the updated set of values of said plurality of characteristic parameters existing at the last waypoint which corresponds to the destination of said flight Vn; and thereafter, automatically updating, based on the updated set of values recorded for the flight Vn, including the value of the mass of fuel on board, the initial values of the plurality of characteristic parameters relating to the flight Vn+1.

2. The method as claimed in claim 1, wherein the values of the characteristic parameters are determined with the aid of at least one prediction function.

3. The method as claimed in claim 1, wherein, if an operator provides time information corresponding to time spent on the ground by the aircraft between said flight Vn and the flight Vn+1, then a sum of the value of the time of arrival of the flight Vn, which was recorded automatically at the end of said flight Vn, and of the time information provided by the operator is used as a value of the departure time of said flight Vn+1.

4. The method as claimed in claim 1, wherein, if an operator provides mass information corresponding to a variation in fuel-less mass achieved on the ground between said flight Vn and the flight Vn+1, then a sum of the value of the mass of fuel on board, which was recorded at the end of the flight Vn, of the unladen mass of the aircraft, and of the mass information provided by the operator is used as a value of the total mass of the aircraft at the departure of said flight Vn+1.

5. The method as claimed in claim 1, wherein, if an operator provides the values of initial data for said flight Vn+1, then said values provided by the operator are used by priority with respect to the values recorded for the previous flight Vn, for the same data.

6. A device for aiding management of flights, for successive flights of an aircraft, which are such that a destination of a flight Vn corresponds to an origin of a next flight Vn+1, n being an integer greater than or equal to 1, each flight Vn and Vn+1 being carried out according to a respective flight plan PVn and PVn+1, each flight plan comprising a plurality of waypoints, said device comprising:

a first unit inputting data; and a second unit automatically determining (i) for the flight Vn, with aid of initial data, of the flight plan PVn and of characteristics relating to the aircraft, for each waypoint of said flight plan PVn, initial values of a plurality of characteristic parameters, including the following characteristic parameters: transit time, speed, altitude, and mass of fuel on board and (ii) initial values of said plurality of characteristic parameters for said flight Vn+1 and of characteristics related to the aircraft, with aid of the initial values relating to a destination D1 of said flight plan PVn, for each waypoint of said flight plan PVn+1;

a third unit forecasting, during the flight, based on said initial values of said plurality of characteristic parameters for the flight Vn and the updated set of values recorded for the flight Vn, including the value of the mass of fuel on board, the expected conduct of the flight Vn+1 based on forecasted values of the plurality of characteristic parameters relating to the flight Vn+1;

a fourth unit replacing, in accordance with actual conditions of said flight Vn, said initial values of at least some of said plurality of characteristic parameters with modified values of said at least some of said plurality of characteristic parameters, for each waypoint of said corresponding flight plan PVn, to obtain an updated set of values of said plurality of characteristic parameters which includes said modified values of said at least some of said plurality of characteristic parameters and said initial values of other characteristic parameters of said plurality of characteristic parameters;

a fifth unit automatically recording, on at least one recording medium, for said flight Vn, the updated set of values of said plurality of characteristic parameters existing at the last waypoint which corresponds to the destination of the flight Vn; and a sixth unit automatically transmitting said updated set of values recorded on said recording medium to said second unit, wherein:

said second unit is configured to automatically update, based on said updated set of values recorded for the flight Vn, including the value of the mass of fuel on board, the initial values of the plurality of characteristic parameters relating to said flight Vn+1.

7. The device as claimed in claim 6, further comprising an automatic unit selecting by priority values input with aid of said first unit with respect to values relating to the same data which were recorded by said third unit, so that they are transmitted to said second unit and used by the third unit.

8. The method of claim 1, wherein the value of the mass of fuel on board, recorded at the destination of said flight Vn, is used to determine a characteristic parameter of a flight subsequent to the flight Vn+1.

* * * * *